(12) United States Patent
Kim

(10) Patent No.: US 6,476,356 B2
(45) Date of Patent: Nov. 5, 2002

(54) METAL CORED WIRE FOR GAS SHIELDED ARC WELDING HAVING EXCELLENT ZINC PRIMER RESISTANT PERFORMANCE AND LOW TEMPERATURE IMPACT TOUGHNESS

(75) Inventor: Jongwon Kim, Changwon (KR)

(73) Assignee: Kiswel Ltd., Kyoungnam (CN)

( * ) Notice: Subject to any disclaimer, the term of this patent is extended or adjusted under 35 U.S.C. 154(b) by 0 days.

(21) Appl. No.: 09/842,854

(22) Filed: Apr. 27, 2001

(65) Prior Publication Data
US 2002/0014478 A1 Feb. 7, 2002

(30) Foreign Application Priority Data
Apr. 27, 2000 (KR) .................................. 2000-0022584

(51) Int. Cl.⁷ .............................................. B23K 35/02
(52) U.S. Cl. .............................. 219/145.22; 219/145.1; 219/146.1
(58) Field of Search .................. 219/145.22, 146.1, 219/145.1, 145.21, 145.32; 148/23

(56) References Cited
U.S. PATENT DOCUMENTS 3,911,244 A * 10/1975 Nakamura et al. .......... 219/146
4,185,136 A * 1/1980 Wasserman et al. ......... 428/561
4,723,061 A * 2/1988 Munz et al. ............ 219/146.24
5,233,160 A * 8/1993 Gordish et al. ...... 219/137 WM
5,369,244 A * 11/1994 Kulikowski et al. ... 219/145.22

* cited by examiner

Primary Examiner—M. Alexandra Elve
(74) Attorney, Agent, or Firm—Bacon & Thomas

(57) ABSTRACT

A flux cored wire for gas-shielded arc welding is disclosed. The flux cored wire is excellent in a zinc resistant primer performance and a low temperature impact toughness and comprises a flux filled in a mild steel sheath. The flux comprises: an oxide of $TiO_2+SiO_2+Al_2O_3$ in an amount of 2% to 10% by weight of the wire; at least one component in an amount of 0.1% to 1.0% by weight of the wire, the one component being selected from a metal fluoride group consisting of $CaF_2$, NaF, $K_2SiF_6$, $Na_2SiF_6$ and KF, a metal titanium in an amount of 0.1% to 0.25 t % by weight of the wire; a metal boron in an amount of 0.002% to 0.008% by weight of the wire; and a subsidiary component in an amount of 5% to 20% by weight of the wire, the subsidiary component consisting of an iron component, a deoxidizer and an arc stabilizer.

1 Claim, 1 Drawing Sheet

METAL CORED WIRE FOR GAS SHIELDED ARC WELDING HAVING EXCELLENT ZINC PRIMER RESISTANT PERFORMANCE AND LOW TEMPERATURE IMPACT TOUGHNESS

BACKGROUND OF THE INVENTION

1. Field of the Invention

The present invention relates to a welding wire having an excellent zinc primer resistant performance and good low temperature impact toughness, and more particularly, to a metal cored wire for gas-shielded arc welding having an excellent zinc primer resistant performance and low temperature impact toughness capable of restraining a welding defect due to the welding fume generated by a zinc primer upon welding a steel workpiece on which the zinc primer is coated with for preventing an occurrence of corrosion, enhancing the low temperature impact toughness in the weld metal.

2. Description of the Related Art

Steel materials widely used in a large-scale architecture such as shipbuilding, bridges, steel frames, etc., are large in shape and thickness, and have various shapes. To this end, there frequently occur circumstances that it is impossible to perform a mass production of zinc plated steels through a plating process such as an electric zinc plating or a hot dip galvanizing, etc. Especially, since much time is spent in fabricating such the architectures, it is noted to prevent an occurrence of corrosion.

Accordingly, an inorganic zinc primer containing zinc powder having an excellent corrosion-preventive capability is coated in a thickness range of 10 $\mu$m to 100 $\mu$m on the surface of the steel material, which prevents a corrosion that may occur at the surface of the steel material during the manufacture of such architectures.

There are various welding methods for welding a steel material on which a zinc primer is deposited. For example, in these days, a gas shielded arc welding method is mainly used for high efficiency of the welding works. The gas shielded arc welding method employs a flux cored wire as a welding consumable and is obtaining the popularity because of various advantages such as good welding workability and arc stability, small occurrence amount of a spatter, and uniform appearance of the welding bead.

However, when a flux cored wire is used in a steel material on which a zinc primer is deposited, a vaporized zinc gas which is generated by a vaporization of zinc powder contained in the primer generates a defect such as a pit or a blow hole at the weld metal. Especially, such defects in the weld metal causes a drawback rendering physical properties to be more worse in an architecture such as shipbuilding or bridge where a low temperature impact characteristic is important.

In order to resolve the aforementioned problems, there are provided a method in which a sufficient deoxidizing alloying agent is added in a filling flux of the flux cored wire and a method in which a filling flux in a lime system is used.

The aforementioned methods, however, contain a lot of basic components in the filling flux and thereby they render the slag covering properties or the bead shape to be worse or the spatter to be excessively generated. Also, these methods lower the ductility of the bead to thereby degenerate the low temperature impact toughness.

SUMMARY OF THE INVENTION

Accordingly, an object of the present invention is to provide a metal flux cored wire (hereinafter referred to as metal cored wire) capable of preventing an occurrence of a defect in the weld metal by optimizing a nature of a welding slag and rapidly discharging a welding gas generated during welding and a welding fume into the outside of the weld metal.

Another object of the present invention is to provide a metal cored wire capable of enhancing the low temperature toughness by controlling an amount of a diffusible hydrogen remaining in the weld metal.

Still another object of the present invention is to provide a metal cored wire capable of obtaining a good welding workability.

Additional features and advantages of the invention will be set forth in part in the description which follows and in part will become apparent to those having ordinary skill in the art upon examination of the followings or may be learned from practice of the invention. The objectives and other advantages of the invention will be realized and attained as particularly pointed out in the appended claims.

To achieve the object and in accordance with the purpose of the present invention, as embodied and broadly described, a flux cored wire for gas-shielded arc welding comprises a flux filled in a mild steel sheath in an amount of 10% to 25% by weight of the wire. The flux comprises: an oxide of $TiO_2 + SiO_2 + Al_2O_3$ in an amount of 2% to 10% by weight of the wire; at least one component in an amount of 0.1% to 1.0% by weight of the wire, the one component being selected from a metal fluoride group consisting of $CaF_2$, $NaF$, $K_2SiF_6$, $Na_2SiF_6$ and $KF$, a metal titanium in an amount of 0.1% to 0.25 t % by weight of the wire; a metal boron in an amount of 0.002% to 0.008% by weight of the wire; and a subsidiary component in an amount of 5% to 20% by weight of the wire, the subsidiary component consisting of an iron component, a deoxidizer and an arc stabilizer.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

Figure 1:
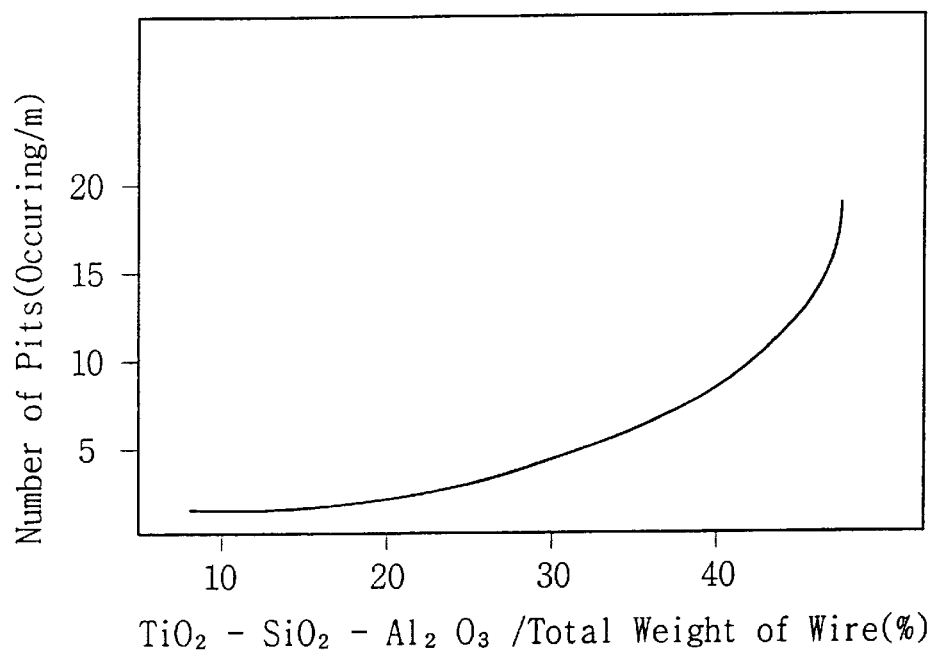
FIG. 1 is a graph showing a relationship between an amount of a slag forming agent contained in a flux and the number of pits occurring.

A preferred embodiment of the present invention will now be described with reference to the accompanying drawings. In the following description, same drawing reference numerals are used for the same elements even in different drawings. The matters defined in the description such as a detailed construction and elements of a circuit are nothing but the ones provided to assist in a comprehensive understanding of the invention. Thus, it is apparent that the present invention can be carried out without those defined matters. Also, well-known functions or constructions are not described in detail since they would obscure the invention in unnecessary detail. The aforementioned amounts of the components affect on the welding as follows.

Titanium dioxide ($TiO_2$) is an agent for forming a slag and makes a role in enhancing the covering property and the peeling property of the slag and the arc stability. It is desirous that $TiO_2$ should be contained at least 3 wt % or more based on a total weight of the cored wire. However, when $TiO_2$ is contained in excess of 5 wt %, arc widens, penetration becomes shallow, and a weld defect increases. Accordingly, it is necessary to control the amount of $TiO_2$ not to exceed 5 wt %.

Silicon dioxide ($SiO_2$) is a representative agent for forming a slag and functions as a constituent capable of partially substituting for $TiO_2$. Although $SiO_2$ makes better the fluidity of the slag and improves the slag peeling property, an amount in excess of a proper amount range not only makes worse the peeling property of the slag worse but generates lots of spatter and fume, thereby the welding workability is lowered and a weld failure increases.

FIG. 1 is a graph showing an occurrence result of a pit which is a welding defect depending on the variation in the amount of $TiO_2+SiO_2+Al_2O_3$ with respect to the total weight of the cored wire.

As shown in FIG. 1, an occurrence amount of pits is maintained in a constant value up to 10 wt %, starts to increase passing 10 wt %, and is abruptly enhanced in excess of 40 wt %.

Alumina ($Al_2O_3$) is to control the fluidity of the slag and improve an appearance of bead. When it is contained in excess of 1.5 wt % based on the total weight of the cored wire, the slag is hardened to thereby lower the peeling property. Also, since it remains as nonmetallic inclusion component in the deposited metal, the low temperature toughness is lowered. Accordingly, it is requested to control the amount of $Al_2O_3$ together with $TiO_2$ and $SiO_2$ to be 10 wt % or less with respect to the total weight of the cored wire.

Metal fluoride acts as an agent for helping to remove hydrogen contained in molten weld steel and molten slag. Especially, metal fluoride lowers viscosity of slag in an acid region and shows very excellent dehydrogenation. Accordingly, added metal fluoride effectively restrains an amount of diffusible hydrogen from increasing in the weld metal, thereby enhancing a crack resistant capability and a porosity resistant capability, resulting in the enhancement of toughness in the weld metal.

Figure 2:
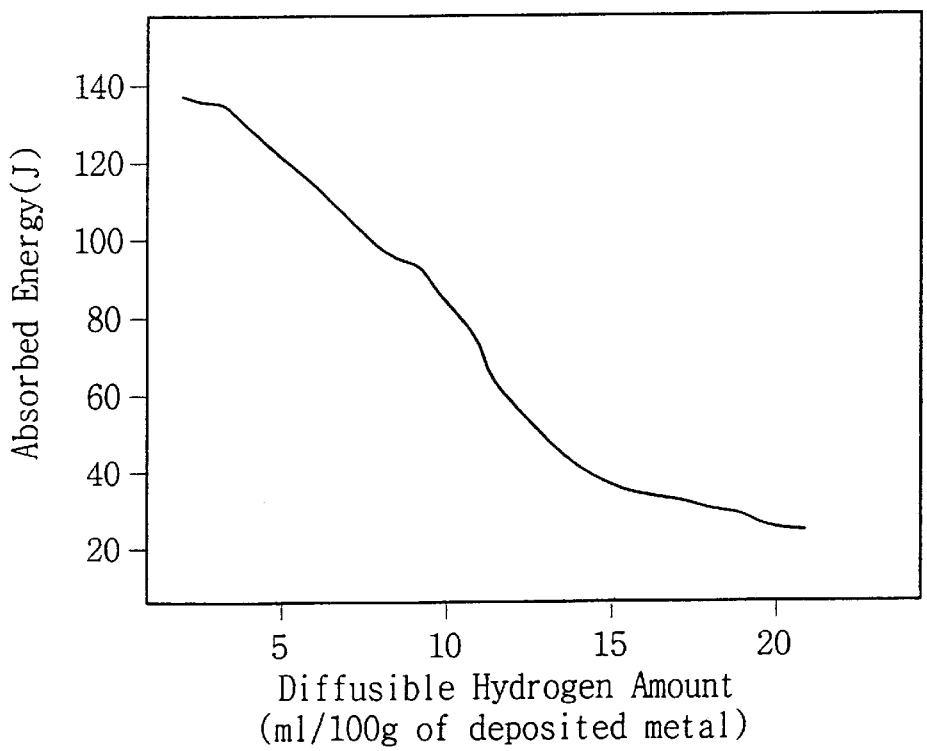
FIG. 2 is a graph showing a relationship between a diffusible hydrogen amount and an impact absorbed energy.

FIG. 2 is a graph showing a variation in the absorption energy of the weld metal depending on an amount of diffusible hydrogen that is a residual in a deposited metal.

As shown in FIG. 2, as the amount of the diffusible hydrogen increases, the impact absorbed energy of the deposited metal is drastically lowered In order to obtain an effect due to the existence of metal fluoride, at least one kind of metal fluoride should be added 0.1 wt % or more with respect to the total weight of the cored wire but when its amount is in excess of 1.0 wt %, a viscosity of the slag is abruptly lowered, thereby bead appearance is failed and an occurrence amount of spatter and welding fume also increases.

Titanium (Ti) is to obtain effects of deoxidation and denitrogenation. If the amount of Ti contained in the cored wire is less than 0.1 wt % based on the total weight of the cored wire, the cored wire lacks in the deoxidation capability. As a result, an oxidation waste of boron (B) is accelerated and a hardening effect due to boron is lowered, thereby a grain size of a weld metal becomes larger and a low temperature toughness is also lowered. If the amount of Ti is in excess of 0.25 wt %, the amount of Ti in the deposited metal increases together with, thereby toughness of the cored wire is lowered and the cored wire becomes sensitive to cracks.

Boron (B) is a component for improving low temperature toughness. If the amount of boron contained in a cored wire is less than 0.002 wt %, there is scarcely any improvement effect of toughness. If the amount of boron contained in a cored wire is in excess of 0.008 wt %, the deposited metal is hardened, thereby toughness of the cored wire is abruptly lowered and high temperature crack may occur.

In addition to the aforementioned main components, an alloy of iron (Fe)-manganese (Mn) is added as deoxidation agent. In the alloy of Fe—Mn, it is desirous that the amount of Mn is in the amount range of 73 wt % to 80 wt % with respect to a total weight of Fe—Mn. And, in a cored wire, it is desirous that the amount of Mn is not in excess of 5 wt % with respect to a total weight of the cored wire. If the amount of Mn is in excess of 5 wt %, the deposited metal is hardened, thereby the cored wire becomes brittle, is low in toughness and is apt to generate cracks.

And, it is preferable that an amount of silicon (Si)-base deoxidation agent which is added in a form of metal silicon or an alloy of Fe—Si is not in excess of 3 wt % with respect to a total weight of the cored wire. This is because, when the amount is in excess of 3 wt %, low temperature impact toughness in the cored wire is lowered.

Advantages and features of the present metal cored wire having the aforementioned components and amounts will be apparently understood through detailed descriptions based on the following embodiments.

Table 1 shows composition variation of flux in examples in accordance with the preset invention and comparative examples in accordance with the conventional art.

TABLE 1

| | Flux composition (wt % with respect to total weight of wire) | | | | | | | | | | | | |
|---|---|---|---|---|---|---|---|---|---|---|---|---|---|
| | Arc stabilizer and slag forming agent | | | | | Metal fluoride | | | Deoxidation agent | | | | |
| Item | $TiO_2$ | $SiO_2$ | $Al_2O_3$ | $Na_2SiO_3$ | $K_2SiF_6$ | $Na_2SiF_6$ | NaF | CaF | Mn | Si | Ti | B | Iron |
| EXAMPLE | | | | | | | | | | | | | |
| 1 | 4.2 | 1.2 | 0.8 | 0.3 | 0.15 | 0.1 | 0.3 | 0.0 | 2.2 | 1.2 | 0.3 | 0.003 | bal. |
| 2 | 4.2 | 1.2 | 0.3 | 0.1 | 0 | 0.1 | 0.3 | 0.0 | 2.2 | 1.2 | 0.3 | 0.003 | bal. |
| 3 | 3.5 | 1.2 | 0.6 | 0.1 | 0.1 | 0.0 | 0.2 | 0.0 | 2.2 | 1.2 | 0.2 | 0.004 | bal. |
| 4 | 4.2 | 1.2 | 0.6 | 0.1 | 0.1 | 0.0 | 0.2 | 0.0 | 2.2 | 1.2 | 0.2 | 0.004 | bal. |
| 5 | 3.5 | 1.2 | 0.8 | 0.0 | 0.1 | 0.1 | 0.2 | 0.0 | 2.2 | 1.2 | 0.2 | 0.004 | bal. |
| 6 | 3.0 | 0.8 | 0.8 | 0.4 | 0.1 | 0.0 | 0.2 | 0.0 | 2.2 | 1.2 | 0.2 | 0.004 | bal. |
| 7 | 2.0 | 1.2 | 0.3 | 0.4 | 0 | 0.2 | 0.2 | 0.2 | 2.2 | 1.2 | 0.2 | 0.003 | bal. |
| 8 | 2.0 | 1.2 | 0.6 | 0.2 | 0 | 0.2 | 0.2 | 0.0 | 2.2 | 1.2 | 0.2 | 0.004 | bal. |
| 9 | 3.0 | 0.8 | 0.3 | 0.2 | 0 | 0.2 | 0.2 | 0.0 | 2.2 | 1.2 | 0.4 | 0.004 | bal. |

TABLE 1-continued

| | Flux composition (wt % with respect to total weight of wire) | | | | | | | | | | | | |
|---|---|---|---|---|---|---|---|---|---|---|---|---|---|
| | Arc stabilizer and slag forming agent | | | | | Metal fluoride | | | Deoxidation agent | | | | |
| Item | $TiO_2$ | $SiO_2$ | $Al_2O_3$ | $Na_2SiO_3$ | $K_2SiF_6$ | $Na_2SiF_6$ | NaF | CaF | Mn | Si | Ti | B | Iron |
| COMP. | | | | | | | | | | | | | |
| 10 | 2.0 | 1.2 | 0.3 | 0.2 | 0.2 | 0.2 | 0.2 | 0.0 | 2.2 | 1.2 | 0.2 | 0.010 | bal. |
| 11 | 7.0 | 1.2 | 0.8 | 0.0 | 0 | 0.2 | 0.2 | 0.2 | 2.2 | 1.2 | 0.2 | 0.006 | bal. |
| 12 | 6.2 | 2.0 | 0.8 | 0.0 | 0 | 0.2 | 0.2 | 0.0 | 2.2 | 1.2 | 0.2 | 0.006 | bal. |
| 13 | 5.6 | 2.2 | 0.8 | 0.1 | 0 | 0.1 | 0.2 | 0.0 | 2.2 | 1.2 | 0.2 | 0.009 | bal. |

Using wires having compositions of Table 1, performance tests of welding samples are performed under the condition of Table 2 and test results are shown in Table 3.

TABLE 2

| Welding current | Welding voltage | Welding speed | Shielded gas | Base metal | Welding method | Thickness of coated zinc primer |
|---|---|---|---|---|---|---|
| 280 A | 31 V | 70 cm/min | 80% Ar + 20% $CO_2$ gas(20./min) | 50 Kgf/mm² of high tensile strength steel(20t × 500 mmL) | Horizontal fillet welding | 50–100 μm |

TABLE 3

| | Zinc resistant primer performance | Welding workability | Low temp. impact(−30./J) | All around determination |
|---|---|---|---|---|
| Example | | | | |
| 1 | . | . | x | x |
| 2 | . | . | x | x |
| 3 | . | . | . | . |
| 4 | . | . | . | . |
| 5 | . | . | . | . |
| 6 | . | . | . | . |
| 7 | . | x | . | . |
| 8 | . | x | . | . |
| Comparative example | | | | |
| 9 | . | x | x | x |
| 10 | . | x | x | x |
| 11 | x | . | x | x |
| 12 | x | . | x | x |
| 13 | x | . | . | x |

For impact test, specimens of example and comparative example were welded according to standard of JIS Z3133 with a sample of number 4 of JIS Z3111.

Zinc resistant primer performance was judged from the number of pits occurring within 500 mm of a welding length and when the number of pits occurring is three or more, it was determined to be bad (i.e., "x").

Low temperature impact characteristic was determined to be bad when its value is 40 J or less at a temperature of −30° C.

When at least one item among the evaluation items was bad, the test example was determined to be failure(i.e., "x").

As shown in Table 1 to Table 3, an amount of $TiO_2$ among the slag forming agents and the arc stabilizers should be at least 3 wt % or more but specimens of comparative example numbers 11, 12 and 13 exceeding 5 wt % with respect to the total weight of the cored wire showed a result that zinc resistant primer performance is bad. If an amount of $TiO_2$ is in excess of 6 wt % (comparative example numbers 11 and 12), the penetration is small and such a shallow penetration badly affects on the low temperature impact characteristic. In the meanwhile, if a content of $TiO_2$ is less than 3 wt % which corresponds to specimens having example numbers 7 and 8 and comparative example number 10, the slag formation and stabilization are insufficient and therefore welding workability is lowered.

Also, since the comparative example number 10 excessively contains the metal B, the low temperature impact value is bad while the comparative example number 9 is good in the zinc resistant primer characteristic but it is bad in the slag stabilization as well as the low temperature impact value because of the excess of the contained metal Ti. As a result, the welding workability is lowered.

Although the example numbers 1 and 2 also exceed the proper amount range of metal Ti, since Ti amounts of them are small compared with that of the comparative example number 9, the welding workability is not lowered and only the low temperature impact value is lowered.

As described previously, a flux cored wire for the gas-shielded arc welding in accordance with the present invention controls an amount and composition of the slag forming agent and stabilizer, thereby easily discharging a welding fume generated during a welding, restraining an occurrence of a welding defect such as pit or blow hole to a maximum degree, and securing a sufficient low temperature impact value and the welding workability. Thus, the invention improves a quality of the welding work, shortens the time spent in the welding work, and decreases the fabrication costs due to enhancement in the weldability of a large-scale architecture.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A metal cored wire for gas shielded arc welding comprising a flux filled in a mild steel sheath, wherein the flux comprises: an oxide of $TiO_2+SiO_2+Al_2O_3$ in an amount of 2% to 10% by weight of the wire; at least one component in an amount of 0.1% to 1.0% by weight of the wire, the one component being selected from a metal fluoride group consisting of $CaF_2$, $NaF$, $K_2SiF_6$, $Na_2SiF_6$ and $KF$, a metal titanium in an amount of 0.1% to 0.25% by weight of the wire; and a metal boron in an amount of 0.002% to 0.008% by weight of the wire.

* * * * *